May 22, 1934.  V. A. SCHOENBERG  1,960,225
VISCOSITY METER
Filed July 24, 1933
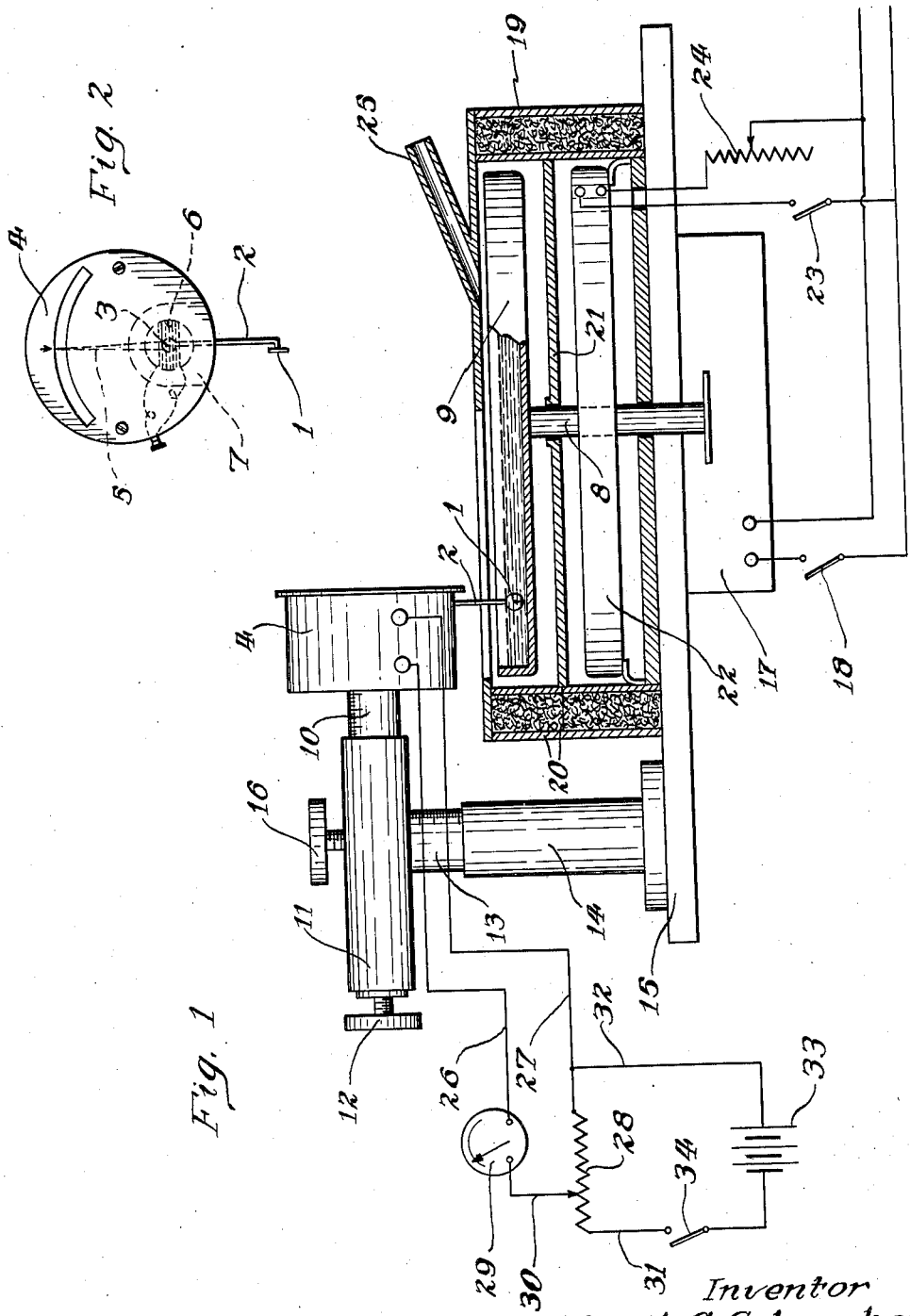
Inventor
Virgil A. Schoenberg Patented May 22, 1934

1,960,225

UNITED STATES PATENT OFFICE 1,960,225

VISCOSITY METER

Virgil A. Schoenberg, Niles Center, Ill.

Application July 24, 1933, Serial No. 681,959

5 Claims. (Cl. 265—11)

This invention relates to instruments for measuring the viscosity or other characteristics of a fluid which are ascertainable by relative movement between the fluid and a drag means.

The purposes of the invention are to provide electromagnetic apparatus for making such measurements under regulated temperatures and definite relative speeds between the fluid and a driven reactance element.

The invention may be practiced by means of a construction as illustrated in the drawing, in which:

Figure 1 is a diagram showing the instrument in side elevation and partly in section.

Fig. 2 is a face view of an electromagnetic reactance device for operating against the drag of a moving fluid.

The principal element of this viscosity meter is a drag device arranged to contact with liquid in motion and to be shifted away from the zero or normal position by the action of the liquid thereon. This drag device is coupled with electromagnetic means for restoring it to its zero position against the action of the moving liquid, and the restoring force required is indicated by an ammeter in electrical units or equivalent units indicating the drag between the liquid and an element immersed therein. This manner of measuring drag by the value of a restoring force permits the use of highly accurate and reliable equipment.

The drag device may be in the form of a disc 1 carried on the lower end of an arm 2 which depends from an armature shaft 3 of an instrument 4 for restoring the drag device against the action of a flowing fluid thereon. A pointer 5 is also carried by the armature shaft and, as shown by Fig. 2, rests in its central or zero position. The pointer and drag device are normally held in the central vertical position as shown by Fig. 2, either by gravity or an equivalent resilient means. In this position the armature coil 6 sets with its axis vertical in the field of a permanent magnet 7. The drag arm 2 and the pointer 5 are deflected from the zero position according to the action of a fluid on disc 1, and the desired measurement of this action is accomplished by energizing the coil 6 from zero value to the point required to restore the indicator 5 to zero position and taking an ammeter reading of the power required.

As the extent of immersion of disc 1 and the velocity of the liquid should be exactly predetermined, instrument 4 is vertically adjustable and also adjustable toward and away from a rotating shaft 8 which carries a liquid container 9. This adjustment is provided for by mounting the restoring instrument 4 on the end of a tube 10 which is slidable horizontally within a sleeve 11 by means of an adjusting screw 12. The sleeve 11 is fixed to the side of a vertically adjustable tube 13 slidable within the sleeve 14 extending upwardly from the supporting base 15. Tube 13 is vertically adjustable within the sleeve 14 by means of screw 16.

The tubes 10 and 13 have scale markings so that the position of the restoring instrument drag element may be exactly determined with reference to the liquid container 9. The latter is rotatable with shaft 8, the lower end of which is coupled with a synchronous motor indicated at 17. The motor is under control of switch 18.

The casing 19 surrounding the liquid container 9 has double walls 20, the space between which is filled with insulating material, and it also has a horizontal partition wall 21 for catching spillage from the liquid container 9. Beneath the partition wall 21 is an electrical heater 22 under the control of a switch 23 and a rheostat 24. The cover of casing 19 is also formed to provide a thermometer well 25 convenient for taking temperature readings from the center of receptacle 9.

The coil 6 of the drag element of restoring means 4 is connected by wires 26 and 27 to a resistance 28. An ammeter 29 is connected in the circuit of wire 26 which terminates in the adjustable contact arm 30 of the resistance which bridges wires 26 and 27 and wires 31 and 32 connecting it with a battery 33.

In making a test for viscosity rating of, for example, a lubricating oil, the container 9 is about half-filled with the oil and set in rotation by closing the switch 18. The oil is also brought to and held at a definite temperature by closing switch 23 and adjusting the rheostat 24. Then adjusting screws 12 and 16 are operated so as to lower disc 1 and to bring it to the desired radial distance from the center of shaft 8 for the desired relative speed between disc 1 and the fluid during the test. Switch 34 is closed and arm 30 is then adjusted along coil 28 to bring a zero reading on the ammeter 29 which indicates no flow through coil 6. Switch 34 may be closed and the arm 30 of the potentiometer adjusted to cause zero indication on the ammeter 29 before the drag element 1 is immersed in the fluid, in which case the pointer 5 would also stand at the zero position and indicate that the drag device has not been deflected by energy from coil 6.

When immersion takes place, the drag device is deflected by action of the flowing fluid, but the hand 5 is not a reliable indicator of viscosity because it gives no measurement of its initial inertia. However, the hand 5 and the drag element 1 are brought back to zero position by an adjustment of arm 30 of the potentiometer, allowing a current to flow through the coil 6 of the value required for restoring hand 5 and the drag 1 to zero. The indicating hand of the ammeter 29 moves up to a position for indicating the energy required for restoring the drag 1. This indication varies according to the viscosity of the liquids tested under like conditions.

It is to be understood that details of the construction shown may be altered or omitted without departing from this invention as defined by the following claims:

I claim:

1. A viscosity meter comprising a fluid container, means for rotating the container and the fluid therein at a definite speed, a temperature regulating means associated with said container, a drag device arranged to be immersed in the fluid and deflected from its normal position by the action of the moving fluid, electrical torque producing means for restoring the drag device to its normal position against the action of the fluid, and an electrical measuring instrument for indicating the power required for restoring the drag device.

2. A viscosity meter comprising a fluid container, means for rotating the container and the fluid therein at a definite speed, a drag device arranged to be immersed in the fluid and deflected from its normal position by the action of the moving fluid, electrical torque producing means for restoring the drag device to its normal position against the action of the fluid, and an electrical measuring instrument for indicating the power required for restoring the drag device.

3. In a viscosity meter a drag device and a liquid container, said drag device being resiliently mounted and movable toward and away from the normal zero position, means for producing relative motion between said drag device and a liquid in said container, electromagnetic means for restoring the drag device to its zero position against the action of the liquid, and an electrical measuring instrument for indicating the power required for restoring the drag device.

4. A viscosity meter comprising a liquid supporting element, a synchronous motor for driving said element, a liquid temperature regulating means, an electromagnetic instrument having an armature, a liquid contact member depending from said armature over said liquid container, means for regulating the depth of immersion of said contact element and for moving it toward and away from the center of the liquid container, and an ammeter and source of electrical energy connected with said armature.

5. In a viscosity meter a drag device and a liquid container, said drag device being resiliently mounted and movable toward and away from the normal zero position, means for producing relative motion between said drag device and a liquid in said container, electromagnetic torque producing means for restoring the drag device to its zero position against the action of the liquid, an operating circuit for said electromagnetic means including a source of electromotive force and a resistance for regulating said circuit, and means for indicating the power required for restoring the drag device.

VIRGIL A. SCHOENBERG.